United States Patent
Lee et al.

(10) Patent No.: US 8,620,253 B2
(45) Date of Patent: Dec. 31, 2013

(54) APPARATUS AND METHOD FOR COMPENSATING FOR DC-OFFSET IN DIRECT CONVERSION RECEIVER OF WIRELESS COMMUNICATIONS SYSTEM

(75) Inventors: Kwang Lee, Yongin-si (KR); Byung Ki Han, Suwon-si (KR); Si Bum Jun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 12/815,794

(22) Filed: Jun. 15, 2010

(65) Prior Publication Data

US 2010/0317312 A1 Dec. 16, 2010

(30) Foreign Application Priority Data

Jun. 15, 2009 (KR) .................. 10-2009-0052699

(51) Int. Cl.
*H04B 1/00* (2006.01)
(52) U.S. Cl.
USPC .......................................... 455/317; 455/324
(58) Field of Classification Search
CPC ........................................................ H04B 1/30
USPC ........................................ 455/307, 313–334
See application file for complete search history.

(56) References Cited

U.S. PATENT DOCUMENTS

| | | | | |
|---|---|---|---|---|
| 5,408,695 A * | 4/1995 | Dorr | ........................... | 455/226.1 |
| 5,584,068 A * | 12/1996 | Mohindra | ..................... | 455/324 |
| 6,871,055 B2 * | 3/2005 | Hirano et al. | .................. | 455/310 |
| 6,973,293 B2 * | 12/2005 | Asam | .......................... | 455/114.2 |
| 7,787,853 B2 * | 8/2010 | Belot et al. | ..................... | 455/334 |
| 7,929,936 B2 * | 4/2011 | Adler et al. | .................... | 455/296 |
| 8,149,955 B2 * | 4/2012 | Tired | ............................. | 375/318 |
| 2002/0051441 A1 * | 5/2002 | Lee | ................................. | 370/342 |
| 2002/0113652 A1 * | 8/2002 | Uto et al. | ....................... | 330/259 |
| 2003/0040294 A1 * | 2/2003 | Staszewski et al. | ........... | 455/337 |
| 2003/0119461 A1 * | 6/2003 | Hirano et al. | .................. | 455/118 |
| 2005/0070240 A1 * | 3/2005 | Adler et al. | ................. | 455/250.1 |
| 2005/0077962 A1 * | 4/2005 | Klein et al. | .................... | 330/258 |
| 2008/0007336 A1 * | 1/2008 | Belot et al. | ..................... | 330/250 |
| 2008/0258809 A1 * | 10/2008 | Yen | .................................... | 330/9 |
| 2009/0060046 A1 * | 3/2009 | Cole | ......................... | 375/240.21 |

FOREIGN PATENT DOCUMENTS

JP          03220823 A    *  9/1991

* cited by examiner

*Primary Examiner* — Lana N Le
(74) *Attorney, Agent, or Firm* — Jefferson IP Law, LLP

(57) ABSTRACT

An apparatus and method of compensating for a direct voltage offset in a direct conversion receiver of a wireless communications system is provided. The apparatus includes a voltage control oscillator for generating a local oscillation signal having the same frequency as an input signal, a frequency converter for combining the input signal with the local oscillation signal, a first compensator for determining a first direct voltage offset generated due to a leaked local oscillation signal flowed into the frequency converter, for feeding back a magnitude of the determined first direct voltage offset to the frequency converter and for compensating for the first direct voltage offset, and a first register for storing a magnitude of direct voltage offset for a first variable gain amplifier, wherein the first variable gain amplifier is positioned in a rear end of the frequency converter, connected to the first register, and performs a modem associated offset compensation using a magnitude of direct voltage offset stored in the first register.

10 Claims, 8 Drawing Sheets

APPARATUS AND METHOD FOR COMPENSATING FOR DC-OFFSET IN DIRECT CONVERSION RECEIVER OF WIRELESS COMMUNICATIONS SYSTEM

PRIORITY

This application claims the benefit under 35 U.S.C. §119 (a) of a Korean patent application filed on Jun. 15, 2009 in the Korean Intellectual Property Office and assigned Serial No. 10-2009-0052699, the entire disclosure of which is hereby incorporated by reference.

BACKGROUND OF THE INVENTION

1. Field of the Invention

The present invention relates to a Radio Frequency Integrated Circuit (RFIC) included in a receiver of a wireless telecommunications system. More particularly, the present invention relates to an apparatus and method for compensating for a direct voltage offset which is generated in an RFIC.

2. Description of the Related Art

In a conventional wireless telecommunications system, the double conversion or the Heterodyne receiver was mainly used. Recently, there is an interest in a direct conversion receiver, also known as a Zero-IF receiver, because it has an advantage in performing a direct conversion into a required frequency without an intermediate frequency generation process, thus simplifying the process as compared to a dual conversion receiver. That is, the dual conversion receiver performs a removal of adjacent channel interference and a gain control according to strength and weakness of received signals in an intermediate frequency unit.

However, since the direct conversion receiver performs the removal of adjacent channel interference and the gain control in a baseband, a receiver can be implemented by a filter having a low quality factor in the direct conversion receiver in comparison with the dual conversion receiver. However, an amplifier included in the direct conversion receiver is difficult to design due to Noise Factor, Linearity, Variable Gain Section, Gain Control Step, Accuracy and Direct Voltage offset (DC-offset). Among them, the Direct Voltage offset is recognized as the most serious problem.

In the meantime, since the frequency of the carrier frequency of the received signal and the frequency of the local oscillator are substantially identical due to the structure of the direct conversion receiver, it is not easy to remove the direct voltage offset generated in the inside of receiver in the baseband. Moreover, since the Radio Frequency Integrated Circuit (RFIC) itself is manufactured using a Complementary Metal Oxide Semiconductor (CMOS) process for integration and miniaturization, there can be a problem that the direct voltage offset generated in the CMOS element is very highly amplified in a section where gain is high even in case a direct voltage offset applied to the baseband amplifier does not exist. In order to compensate for such direct voltage offset, in the related art, a method of compensating for an offset by itself in the inside of an RFIC and a method of removing an offset with reference to a stored value after storing the offset compensation value into memory in association with a modem in the initial driving were proposed.

However, the former method for compensating for an offset has a problem in that it can be used only when there is sufficient time to remove direct voltage offset since much time is required to reach a steady-state in the alteration of gain. Particularly, in the Long Term Evolution (LTE) system in which a time for offset compensation is restricted to be less than 4 μs in the normal operation, it is impossible to compensate for the direct voltage offset by the former method of compensating for an offset. Accordingly, generally, the latter method of removing an offset is used so that the direct voltage offset compensation is applicable within 1 μs. However, the latter method has a problem in that offset can be changed by a low frequency noise generated due to the CMOS characteristic.

SUMMARY OF THE INVENTION

An aspect of the present invention is to address at least the above-mentioned problems and/or disadvantages and to provide at least the advantages described below. Accordingly, an aspect of the present invention is to provide an apparatus and method for compensating for a direct voltage offset in a direct conversion receiver of a wireless telecommunications system, which is capable of compensating for a direct voltage offset for all channel frequency bands by one direct voltage offset compensation value. Another aspect of the present invention is to further provide an apparatus and method for compensating for a direct voltage offset in a direct conversion receiver of a wireless telecommunications system, which is capable of preventing the change of direct voltage offset generated due to a low frequency noise.

In accordance with an aspect of the present invention, a method of compensating for a direct voltage offset in a direct conversion receiver of a wireless communications system is provided. The method includes determining a first direct voltage offset generated due to a leaked local oscillation signal flowed into a frequency converter, feeding back a magnitude of the determined first direct voltage offset to the frequency converter and compensating for the first direct voltage offset, and performing a modem associated offset compensation using a magnitude of direct voltage offset for a first variable gain amplifier stored in a first register by the first variable gain amplifier positioned in a rear end of the frequency converter.

In accordance with another aspect of the present invention, a direct conversion receiver of a wireless communications system is provided. The receiver includes a voltage control oscillator for generating a local oscillation signal having the same frequency as an input signal, a frequency converter for combining the input signal with the local oscillation signal, a first compensator for determining a first direct voltage offset generated due to a leaked local oscillation signal flowed into the frequency converter, for feeding back a magnitude of the determined first direct voltage offset to the frequency converter and for compensating for the first direct voltage offset, and a first register for storing a magnitude of the first direct voltage offset for a first variable gain amplifier, wherein the first variable gain amplifier is positioned in a rear end of the frequency converter, connected to the first register, and performs a modem associated offset compensation using the magnitude of the first direct voltage offset stored in the first register.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
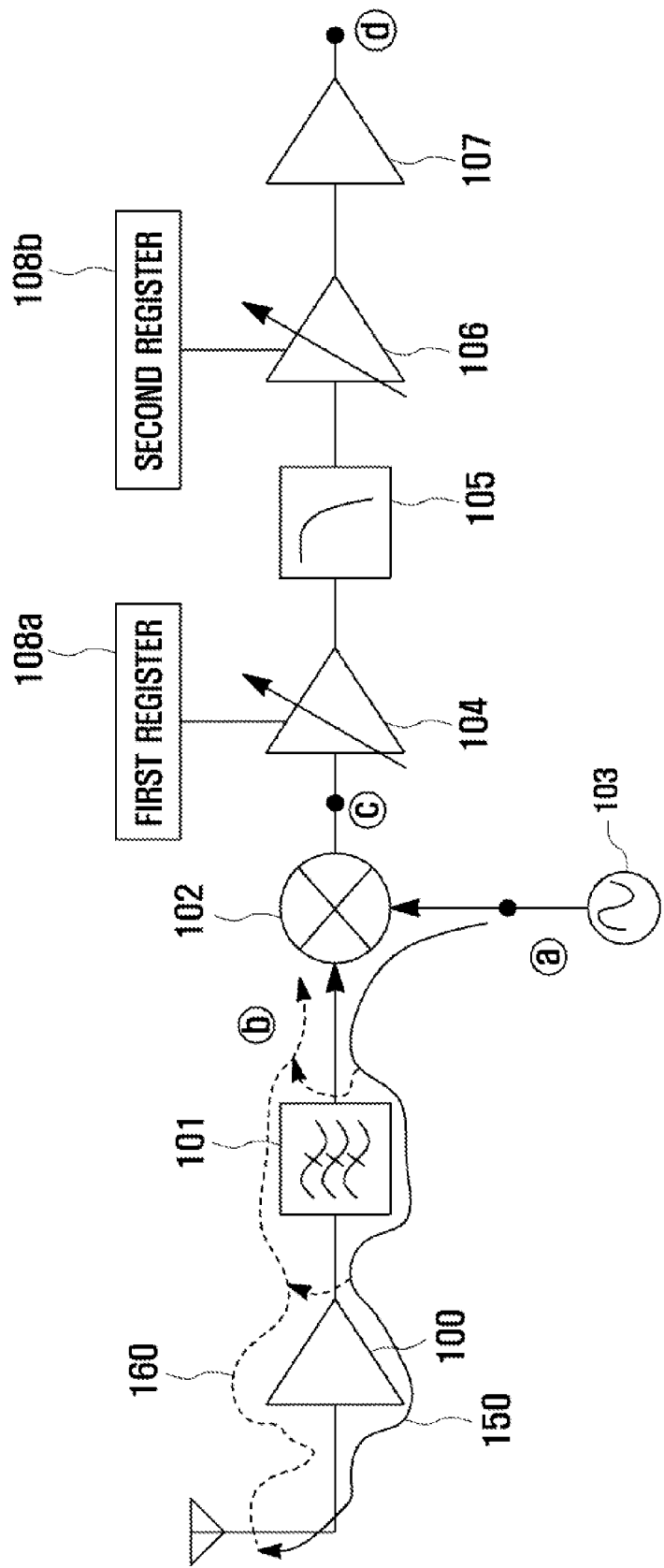
FIG. 1A is a block diagram illustrating a direct conversion receiver according to the related art.
Figure 1B:
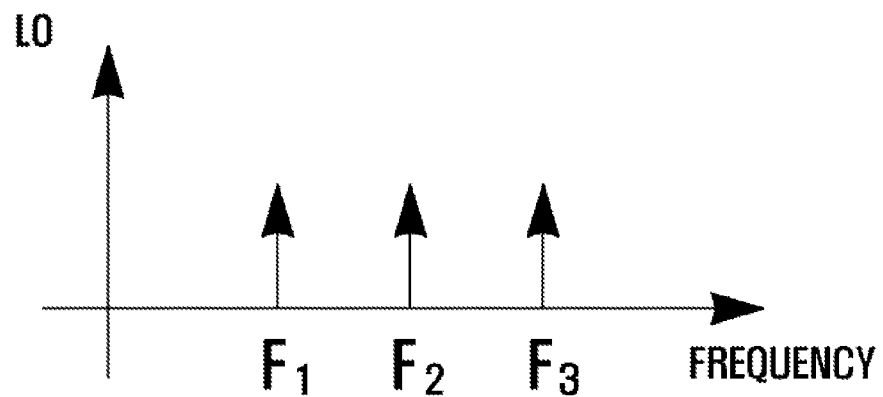
FIGS. 1B to 1E are drawings illustrating a signal measured in a specific point of the direct conversion receiver illustrated in FIG. 1A according to the related art.

FIG. 1A is a block diagram illustrating a direct conversion receiver according to the related art. FIGS. 1B to 1E are diagrams illustrating a signal measured in a specific point of the direct conversion receiver illustrated in FIG. 1A according to the related art. More particularly, FIG. 1A illustrates a receiver for storing an offset compensation value into a memory in association with a modem in an initial driving and for removing a direct voltage offset with reference to the stored value.

Referring to FIG. 1A, the direct conversion receiver inputs a signal received through an antenna to a frequency converter 102 via a Low Noise Amplifier 100 (LNA) and a surface acoustic wave filter 101. Moreover, a Local Oscillation (LO) signal having the same frequency as the signal input to the frequency converter 102 is generated in a Voltage Controlled Oscillator (VCO) 103 and is input to the frequency converter 102. The frequency converter 102 unites respectively input signals to output.

In this case, the method of compensating for the direct voltage offset in the direct conversion receiver through the association with the modem is as follows. First, a direct voltage offset compensation value generated in a second variable gain amplifier 106 and a buffer 107 is stored in a second register 108b. At this time, a low pass filter 105 is by-passed so as to remove the effect of the direct voltage offset received in the front end of the second variable gain amplifier 106. After compensating for the direct voltage offset of the second variable gain amplifier 106 and the buffer 107, the direct voltage offset compensation value generated in the frequency converter 102, a first variable gain amplifier 104 and the low pass filter 105 is stored in a first register 108a such that the offset compensation is completed.

The method of compensating for the direct voltage offset has two types of problems as follows.

Figure 1C:
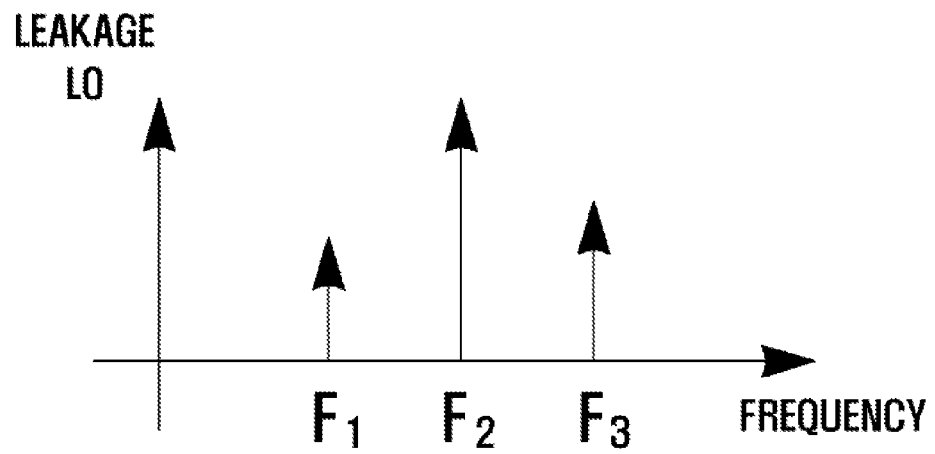
Figure 1D:
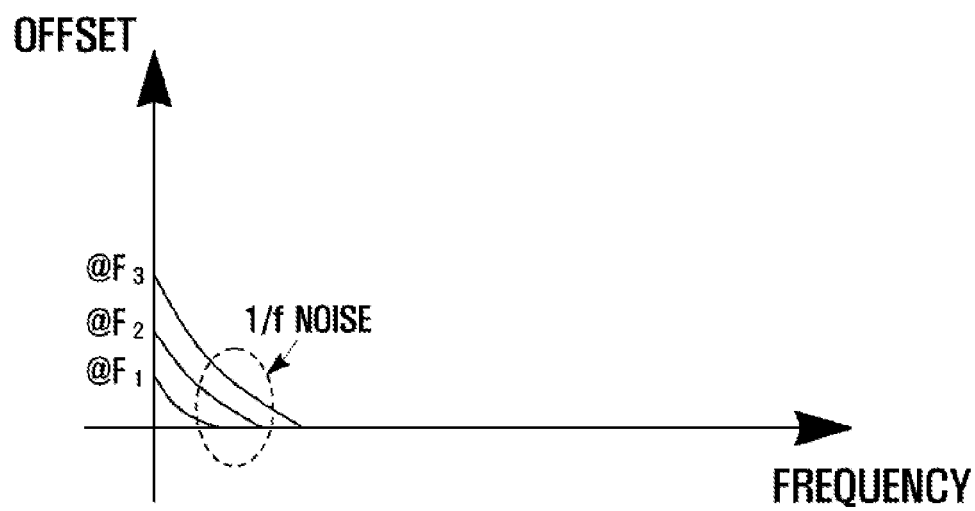
Figure 1E:
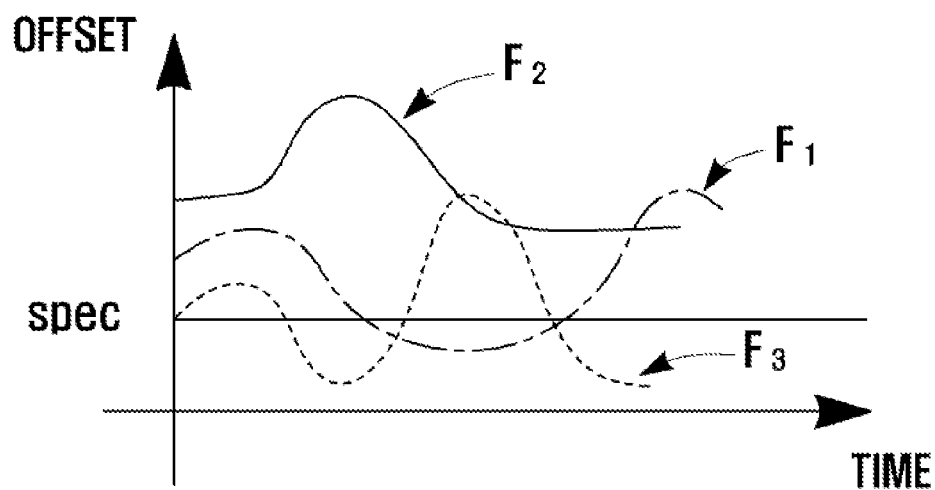

The LO signal (measured at the reference numeral ⓐ and illustrated in FIG. 1B) that is leaked out to the front end of the frequency converter 102 is transmitted by the surface acoustic wave filter 101 and the low noise amplifier 100 to the antenna as illustrated by path 150 such that it is reflected by the antenna so that is flows again into the frequency converter 102 as illustrated path 160. The magnitude of such flowed signal is different depending on the channel frequency as illustrated in FIG. 1C (measured at the reference numeral ⓑ, because the reflection and transfer characteristics are not identical in all channel bandwidths. As shown in FIG. 1D, the direct voltage offset (measured at the reference numeral ⓒ) of the frequency converter 102 output is differentiated according to frequency due to the signal (refer to FIG. 1C) flowed into the frequency converter 102 and the LO signal. Therefore, in case of applying the same compensation value for every frequency, the offset of the receiver output is removed only in one channel frequency band. In order to compensate for the offset according to channel frequency, the compensation value at all channel frequencies should be measured and stored in an initial stage, or the compensation value should be measured whenever changing the channel frequency.

However, the implementation of the compensation value measurement at all channel frequencies is impossible due to an increment of driving time, and the increment of word number of register and Serial Peripheral Interface (SPI). Furthermore, since a time for measuring the compensation value is not given when changing the channel frequency, the offset change according to the channel frequency cannot be compensated. Moreover, in the related art, as shown in FIG. 1D, a low frequency offset can be generated according to time after compensation due to the low frequency noise (1/f noise) caused by the CMOS device characteristic. More particularly, @F1, @F2 and @F3 of FIG. 1D indicates respectively the value of offset voltage generated by the frequency F1, F2 and F3 among LO signals. This low frequency offset can be compensated based on a frame unit, but compensation is impossible when the range of fluctuation is large. In case output is performed while the low frequency offset is not removed, the result like 1E (measured in the reference numeral ⓓ) is output.

Figure 2:
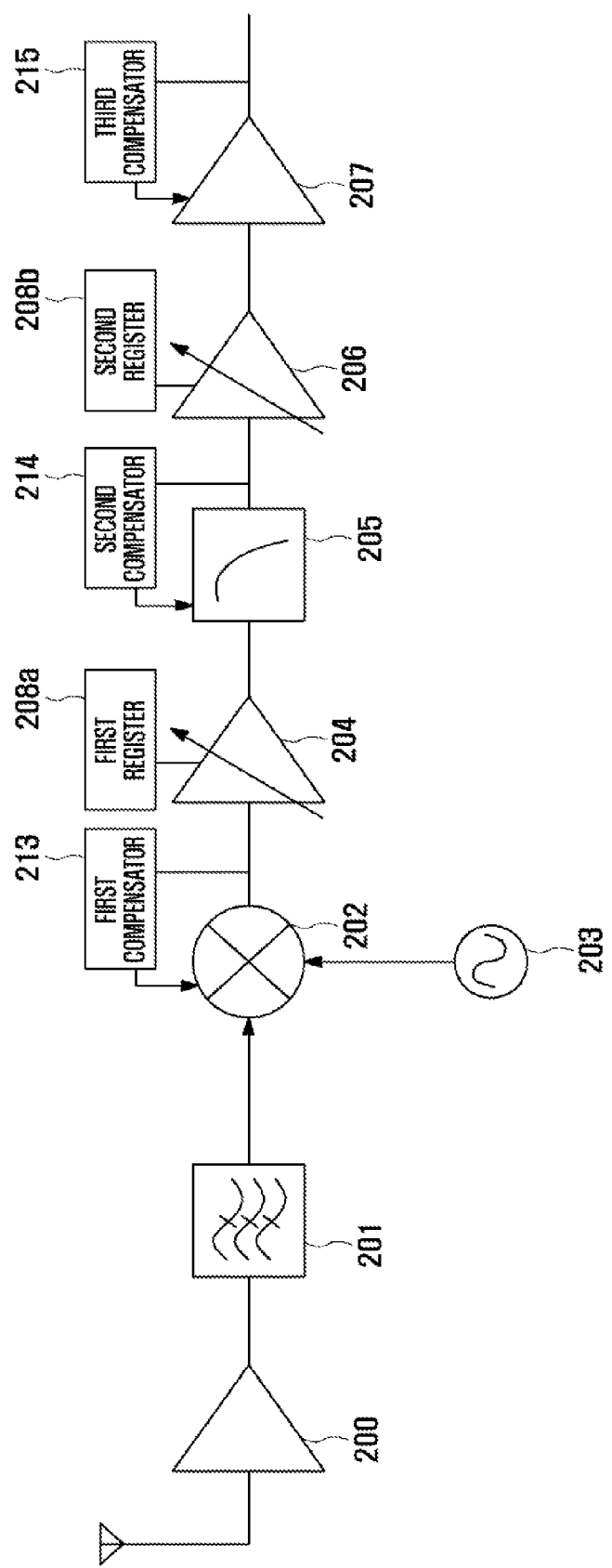
FIG. 2 is a block diagram of a direct conversion receiver according to an exemplary embodiment of the present invention.

FIG. 2 is a block diagram of a direct conversion receiver according to an exemplary embodiment of the present invention.

Referring to FIG. 2, the direct conversion receiver includes a low noise amplifier 200, a surface acoustic wave filter 201, a frequency converter 202, a voltage control oscillator 203, a first variable gain amplifier 204, a low pass filter 205, a second variable gain amplifier 206, and a buffer 207, which are units for implementing a basic function of a direct conversion receiver. Moreover, a first register 208a and a second register 208b are units for performing a direct voltage offset compensation in association with a modem.

More particularly, the direct conversion receiver includes a first compensator 213, a second compensator 214, and a third compensator 215. The first compensator 213 is a unit for compensating for a first direct voltage offset generated in the frequency converter 202 by the leakage of a LO signal. Moreover, the second compensator 214 and the third compensator 215 are units for respectively compensating for a second direct voltage offset and a third direct voltage offset generated by the low frequency noise in the rear end of the frequency converter 202. A more detailed operation of the first compensator 213, the second compensator 214 and the third compensator 215 is illustrated below.

FIGS. 3A to 3E are diagrams illustrating a process of compensating for a direct voltage offset in a direct conversion receiver according to an exemplary embodiment of the present invention. The direct conversion receiver of FIG. 3A uses the same reference numerals as FIG. 2 for the sake of convenience in illustration.

Figure 3A:
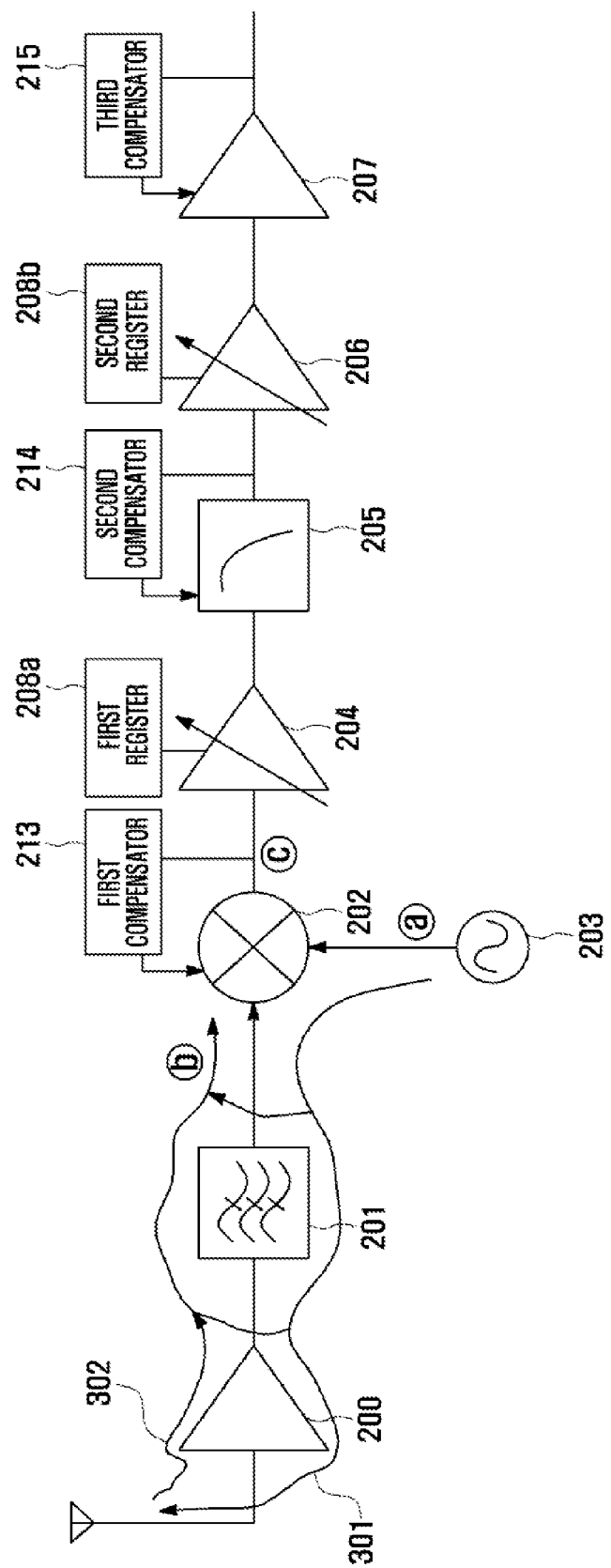
FIGS. 3A to 3E are diagrams illustrating a process of compensating for a direct voltage offset in a direct conversion receiver according to an exemplary embodiment of the present invention.
Figure 3B:
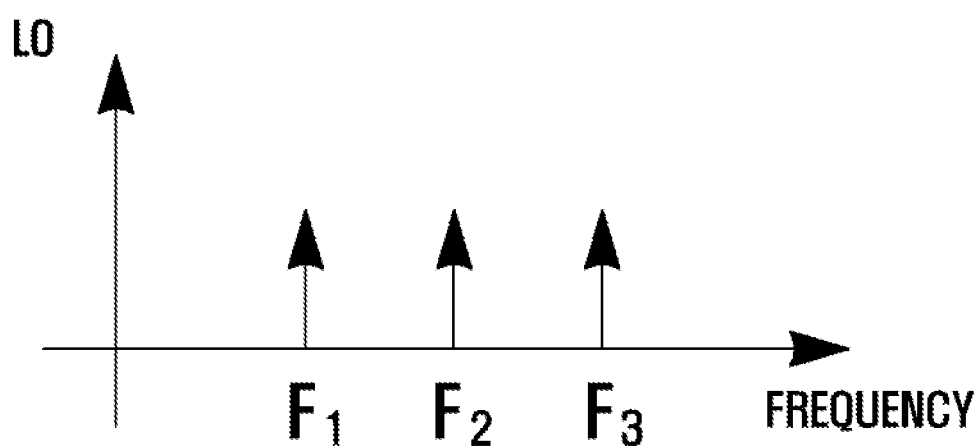
Figure 3C:
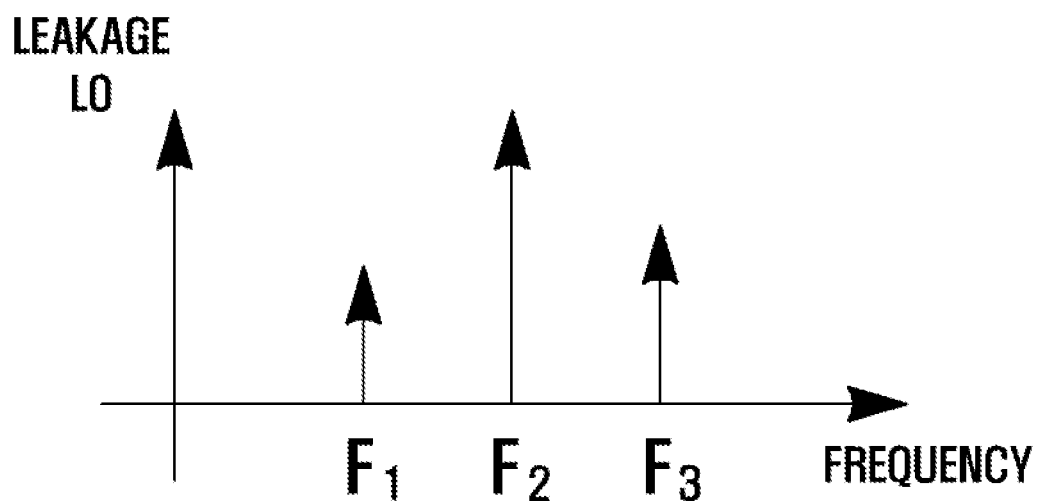

Referring to FIG. 3A, the LO signal (measured at the reference numeral ⓐ and illustrated in FIG. 3B) that is leaked out to the front end of the frequency converter 202 is transmitted by the surface acoustic wave filter 201 and the low noise amplifier 200 to the antenna as illustrated by path 301, such that it is reflected by the antenna and flows again into the frequency converter 202 as illustrated by path 302. The magnitude of this flowed signal (measured at the reference numeral ⓑ and illustrated in FIG. 3C) is different depending on channel frequency as the reflection and the transfer characteristics are not identical in all channel bandwidths.

Figure 3D:
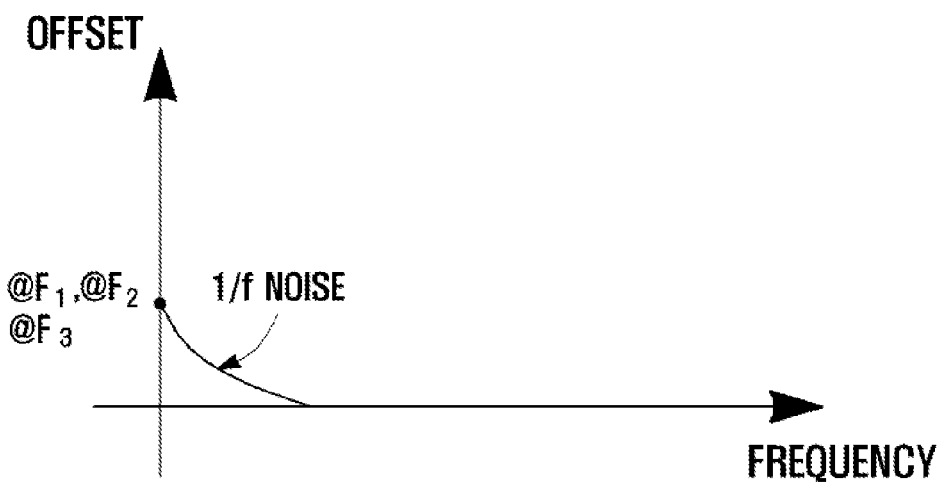

Accordingly, the first direct voltage offset of signals output from the frequency converter 202 should be changed depending on frequency due to the signal flowed into the frequency converter 202 and the local oscillator signal. In an exemplary embodiment of the present invention, since the first compensator 213 of the frequency converter 202 compensates for an offset by itself, it is maintained with a constant value regardless of channel frequency (measured at the reference numeral ⓒ) like FIG. 3D. More particularly, the first compensator 213 has a structure for detecting the first direct voltage offset of signals output from frequency converter 202 and compensating through feedback. Accordingly, the low frequency noise generated in the frequency converter 202 and the front end of the frequency converter 202 can also be removed in the first compensator 213, and FIG. 3D shows that the low frequency noise is decreased in comparison with FIG. 1D. Moreover, the second direct voltage offset and the third direct voltage offset due to the low frequency noise generated in the rear end of frequency converter 202 is compensated by the second compensator 214 and the third compensator 215 respectively.

Figure 3E:
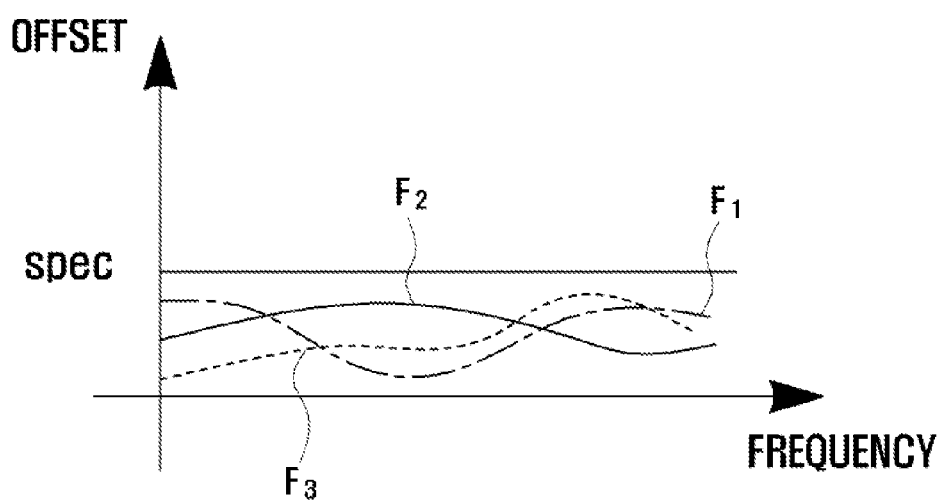

In more detail, the second compensator 214 has a structure for detecting the second direct voltage offset of signals output from the low pass filter 205 and compensating through feedback. Moreover, the third compensator 215 has a structure for detecting the third direct voltage offset of signals output from the buffer 207 and compensating through feedback. Accordingly, after the modem associated offset compensation is performed by using the first register 208a and the second register 208b, the second direct voltage offset and the third direct voltage offset generated due to the low frequency noise are additionally compensated by the second compensator 214 and the third compensator 215 respectively, so that, as shown in FIG. 3E, the final offset (measured at the reference numeral ⓓ) can be steadily maintained with a very small value.

Figure 4:
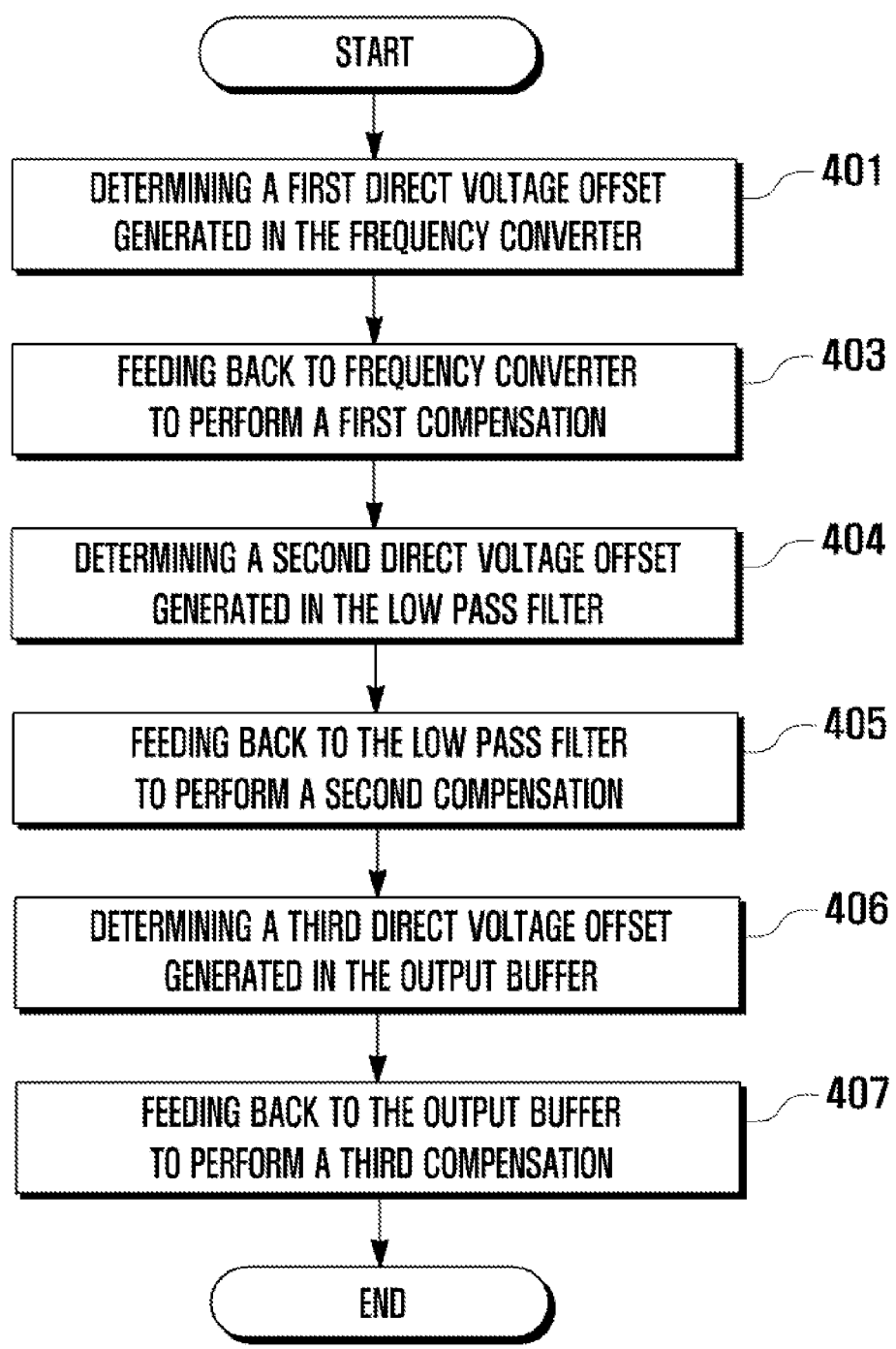
FIG. 4 is a flowchart illustrating a method for compensating for a direct voltage offset in a direct conversion receiver according to an exemplary embodiment of the present invention.

FIG. 4 is a flowchart illustrating a method for compensating for a direct voltage offset in a direct conversion receiver according to an exemplary embodiment of the present invention.

Referring to FIG. 4, the first compensator 213 determines a first direct voltage offset generated due to a leaked LO signal in step 401, which flows into the frequency converter in step 403.

Moreover, the first compensator feeds back a magnitude of the determined first direct voltage offset to the frequency converter. The frequency converter to which the magnitude of the first direct voltage offset is fed back performs a first compensation for compensating for a first direct voltage offset. The second compensator 214 determines a second direct voltage offset generated in the low pass filter positioned in the rear end of frequency converter in step 404, feeds back a magnitude of the determined second direct voltage offset to the low pass filter in step 405. The low pass filter to which the magnitude of the second direct voltage offset is fed back performs a second compensation for counterbalancing an offset. The third compensator 215 determines a third direct voltage offset generated in the output buffer positioned in the rear end of frequency converter in step 406, feeds back a magnitude of the determined third direct voltage offset to the output buffer in step 407. The output buffer to which the magnitude of the third direct voltage offset is fed back performs a third compensation for counterbalancing an offset.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of compensating for a direct voltage offset in a direct conversion receiver of a wireless communications system, the method comprising:
   determining a first direct voltage offset generated due to a leaked local oscillation signal flowed into a frequency converter;
   feeding back a magnitude of the determined first direct voltage offset to the frequency converter and compensating for the first direct voltage offset;
   performing a modem associated offset compensation after the compensation for the first direct voltage offset by the feedback using the fed back magnitude of the first direct voltage offset for a first variable gain amplifier stored in a first register by the first variable gain amplifier positioned in a rear end of the frequency converter;
   determining a second direct voltage offset generated in a low pass filter positioned in a rear end of the first variable gain amplifier;
   compensating for the second direct voltage offset by feeding back a magnitude of the determined second direct voltage offset to the low pass filter;
   performing a modem associated offset compensation using the fed back magnitude of the second direct voltage offset for a second variable gain amplifier stored in a second register by the second variable gain amplifier positioned in a rear end of the low pass filter;
   determining a third direct voltage offset generated in an output buffer positioned in a rear end of the second variable gain amplifier; and
   compensating for the third direct voltage offset by feeding back a magnitude of the determined third direct voltage offset to the output buffer.

2. The method of claim 1, wherein the second direct voltage offset corresponds to a low frequency noise generated in the low pass filter.

3. The method of claim 1, wherein the third direct voltage offset corresponds to a low frequency noise generated in the output buffer.

4. The method of claim 1, wherein the leaked local oscillation signal flowed into a frequency converter comprises a signal reflected from at least one of an antenna, a low noise amplifier, and a surface acoustic wave filter positioned in a front end of the frequency converter.

5. The method of claim 1, wherein the determining of the first direct voltage offset generated due to the leaked local oscillation signal flowed into the frequency converter comprises detecting the first direct voltage offset.

6. A direct conversion receiver of a wireless communications system, the receiver comprising:
   a voltage control oscillator for generating a local oscillation signal having the same frequency as an input signal;
   a frequency converter for combining the input signal with the local oscillation signal;
   a first compensator for determining a first direct voltage offset generated due to a leaked local oscillation signal flowed into the frequency converter, for feeding back a magnitude of the determined first direct voltage offset to the frequency converter, and for compensating for the first direct voltage offset;
   a first variable gain amplifier for performing a first modem associated offset compensation;
   a first register for storing the fed back magnitude of the first direct voltage offset for the first variable gain amplifier;
   a low pass filter positioned in a rear end of the first variable gain amplifier;
   a second compensator for compensating for a second direct voltage offset by feeding back a magnitude of the second direct voltage offset generated in the low pass filter to the low pass filter;
   a second variable gain amplifier for performing a second modem associated offset compensation;
   a second register for storing the fed back magnitude of the second direct voltage offset for the second variable gain amplifier;
   an output buffer positioned in a rear end of the second variable gain amplifier; and
   a third compensator for compensating for a third direct voltage offset by feeding back a magnitude of the third direct voltage offset generated in the output buffer to the low pass filter,
   wherein the first variable gain amplifier is positioned in a rear end of the frequency converter, connected to the first register, and performs the first modem associated offset compensation after the compensation for the first direct voltage offset by the feedback using the fed back magnitude of the first direct voltage offset stored in the first register, and
   the second variable gain amplifier is positioned in a rear end of the low pass filter, connected to the second register, and performs the second modem associated offset compensation using the fed back magnitude of the second direct voltage offset stored in the second register.

7. The receiver of claim 6, wherein the second direct voltage offset corresponds to a low frequency noise generated in the low pass filter.

8. The receiver of claim 6, wherein the third direct voltage offset corresponds to a low frequency noise generated in the output buffer.

9. The receiver of claim 6, wherein the leaked local oscillation signal flowed into a frequency converter comprises a signal reflected from at least one of an antenna, a low noise amplifier, and a surface acoustic wave filter positioned in a front end of the frequency converter.

10. The receiver of claim 6, wherein the first compensator comprises a structure for detecting the first direct voltage offset generated due to the leaked local oscillation signal flowed into the frequency converter.

* * * * *